US008055703B2

(12) United States Patent
VanRiper et al.

(10) Patent No.: US 8,055,703 B2
(45) Date of Patent: Nov. 8, 2011

(54) METHOD FOR VERIFICATION VIA INFORMATION PROCESSING

(75) Inventors: Ryan A. VanRiper, Maple Grove, MN (US); Andrew Johnson, New Brighton, MN (US)

(73) Assignee: Honeywell International Inc., Morristown, NJ (US)

( * ) Notice: Subject to any disclaimer, the term of this patent is extended or adjusted under 35 U.S.C. 154(b) by 759 days.

(21) Appl. No.: 11/714,604

(22) Filed: Mar. 5, 2007

(65) Prior Publication Data

US 2008/0222709 A1 Sep. 11, 2008

(51) Int. Cl.
*G06F 15/16* (2006.01)

(52) U.S. Cl. ......................... 709/203; 709/217; 709/219

(58) Field of Classification Search .................. 709/217, 709/219

See application file for complete search history.

(56) References Cited

U.S. PATENT DOCUMENTS

| | | | | |
|---|---|---|---|---|
| 6,741,980 | B1 * | 5/2004 | Langseth et al. | 707/2 |
| 2004/0252193 | A1 * | 12/2004 | Higgins | 348/149 |
| 2005/0021225 | A1 * | 1/2005 | Kantarjiev et al. | 701/204 |
| 2005/0168352 | A1 | 8/2005 | Tomer | |
| 2005/0280555 | A1 * | 12/2005 | Warner | 340/932.2 |
| 2006/0029107 | A1 * | 2/2006 | McCullough et al. | 370/527 |
| 2006/0056658 | A1 * | 3/2006 | Kavner | 382/105 |
| 2006/0106622 | A1 * | 5/2006 | Lee | 705/1 |
| 2006/0269104 | A1 * | 11/2006 | Ciolli | 382/104 |
| 2008/0127296 | A1 * | 5/2008 | Carroll et al. | 726/1 |
| 2008/0164974 | A1 * | 7/2008 | Cochran et al. | 340/5.83 |
| 2008/0175438 | A1 * | 7/2008 | Alves | 382/105 |
| 2009/0118996 | A1 * | 5/2009 | Kantarjiev et al. | 701/119 |
| 2009/0177650 | A1 * | 7/2009 | Petersson et al. | 707/5 |

FOREIGN PATENT DOCUMENTS

EP 1486928 A2 12/2004

OTHER PUBLICATIONS

PCT—Notificatin of Transmittal of The International Search Report and The Written Opinion of the International Searching Authority, or Declaration. Date of Mailing: Jun. 30, 2008.

* cited by examiner

*Primary Examiner* — Firmin Backer
*Assistant Examiner* — Jonathan Bui
(74) *Attorney, Agent, or Firm* — Kermit D. Lopez; Luis M. Ortiz; Kevin L. Soules

(57) ABSTRACT

Identification servers are small, perhaps embedded, systems that can be used as subsystems of a tracking and verification system. An identification server can obtain identification data when a trigger, called an identification event, occurs. The identification server can store the identification data in a database module with a key. The identification server can send a message containing the identification data or the key to a set of subscribing clients. Subscribing clients, such as a central database or a graphical user interface, are clients that subscribe to receive messages from the identification server. An identification server can trigger off of an identification message sent by another identification server.

14 Claims, 3 Drawing Sheets

METHOD FOR VERIFICATION VIA INFORMATION PROCESSING

TECHNICAL FIELD

Embodiments relate to sensors, clients, servers, and databases. Embodiments also relate to identification data, image processing, and card readers.

BACKGROUND OF THE INVENTION

There are many systems and methods currently used for obtaining identification data and for detecting the presence of people and vehicles. Driver's license readers are used to control access to buildings. Road loops are used to detect the presence of vehicles. Traffic cameras are used record pictures of speeding vehicles or video of vehicles illegally traversing intersections.

Driver's license readers can be stand alone units or connected units. Stand alone units are sometimes used to control access to venues such as liquor serving establishments. A door man can pass a prospective patron's driver's license through a driver's license reader. The reader can indicate the person's age and can also store data contained in the driver's license. The stored data can later be uploaded to a computer and used to produce mailing lists or demographic statistics. Connected driver's license readers can be connected to a computer by a serial cable, USB cable, a telephone modem, or an Ethernet connection. The computer can then automatically upload the driver's license data.

Road loops have been used as sensors for traffic light sensors, traffic sensors, and camera sensors. A vehicle in the road loop can cause a signal wire to transition to an "on" state. Cameras, counters, and traffic lights can interrogate the signal wire and react to the state of the signal wire.

Traffic cameras are often used to video traffic. In many cases, the traffic cameras are also used to gather evidence for use against speeders and red light runners. A person examines the evidence to determine the transgressing vehicles license plate number. A database query to a vehicle registration database can identify the vehicles owner who then receives a traffic fine.

There are many isolated system for gathering personal data as people move about. Systems and methods for using the personal data as tracking data are needed.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments that a database server and a graphical user interface (GUI) are subscribing clients to one or more identification servers. A subscribing client is a client that subscribes to a server. A client can subscribe to a server by sending a message to the server requesting that the server send certain messages to the client.

It is also an aspect of the embodiments that messages are transmitted over a communications network. The messages are made of data packets. For example, communications over the internet predominantly use the transmission control protocol (TCP) which in turn uses the internet protocol (IP). IP specifies the formation and transmission of data packets whereas TCP specifies reliably sending and receiving messages composed of IP data packets.

It is a further aspect of the embodiments that the identification servers have input modules and server modules. An identification event can trigger the input module to obtain identification data. Obtaining the identification data can trigger the server module to send id messages to its subscribing clients. The id messages can contain the identification data. Alternatively, the identification data can be stored in a database module in association with a key and the id message can contain the key. The key can later be used to retrieve the identification data from the database module.

BRIEF DESCRIPTION OF THE DRAWINGS

The accompanying figures, in which like reference numerals refer to identical or functionally similar elements throughout the separate views and which are incorporated in and form a part of the specification, further illustrate aspects of the embodiments and, together with the background, brief summary, and detailed description serve to explain the principles of the embodiments.

DETAILED DESCRIPTION

The particular values and configurations discussed in these non-limiting examples can be varied and are cited merely to illustrate at least one embodiment and are not intended to limit the scope thereof. In general, the figures are not to scale.

Identification servers are small, perhaps embedded, systems that can be used as subsystems of a tracking and verification system. An identification server can obtain identification data when a trigger, called an identification event, occurs. The identification server can store the identification data in a database module with a key. The identification server can send a message containing the identification data or the key to a set of subscribing clients. Subscribing clients, such as a central database or a graphical user interface, are clients that subscribe to receive messages from the identification server. An identification server can trigger off of an identification message sent by another identification server.

Figure 1:
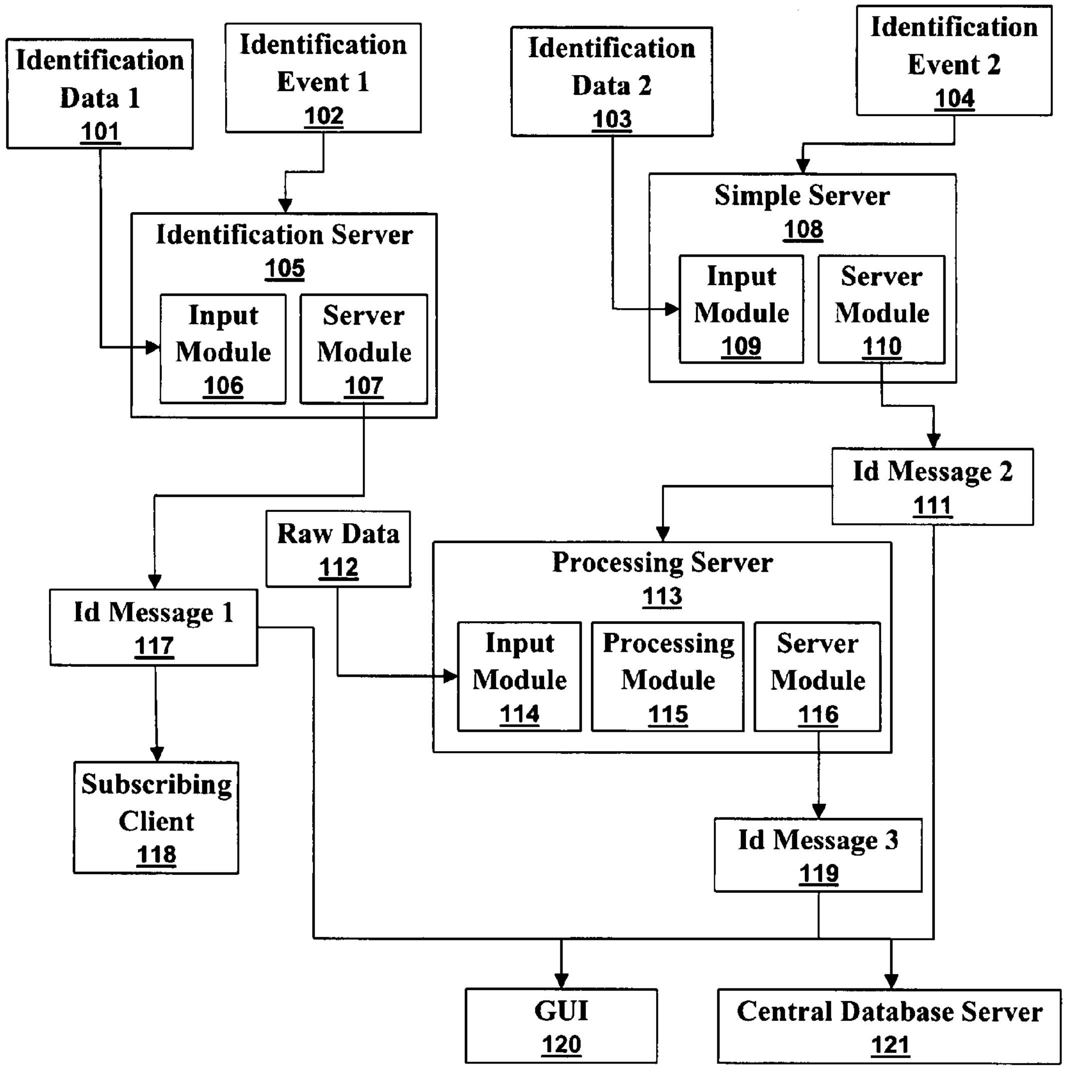
FIG. 1 illustrates a high level block diagram of identification servers and subscribing clients in accordance with aspects of the embodiments.

FIG. 1 illustrates a high level block diagram of identification servers and subscribing clients in accordance with aspects of the embodiments. Identification event 1 102 triggers an input module 106 in an identification server 105 to obtain identification data 1. The input module 106 can pass the data to a server module 107 that encapsulates the identification data 101 in Id message 1 117 which is then sent to the subscribing clients. The identification server 105 is subscribed to by subscribing client 118, graphical user interface (GUI) 120, and central database server 121. GUI 120 can display the identification data 101 to a user while the central database server 121 can store the identification information for future retrieval and use.

Simple server 108 is similar to identification server 105. Identification event 2 104 triggers the input module 109 of simple server 108 to obtain identification data 2 103. Server module 110 can then encapsulate identification data 2 103 into id message 2 111 and send it to the subscribing clients. One of the subscribing clients is processing server 113.

Processing server 113 treats Id message 111 as an identification event that triggers input module 114 to obtain raw data 112. Raw data 112 is passed to processing module 115 that processes raw data 112 to produce identification data that is then passed to server module 116. The server module 116 then sends the identification information within Id message 119 to the subscribing clients.

Figure 2:
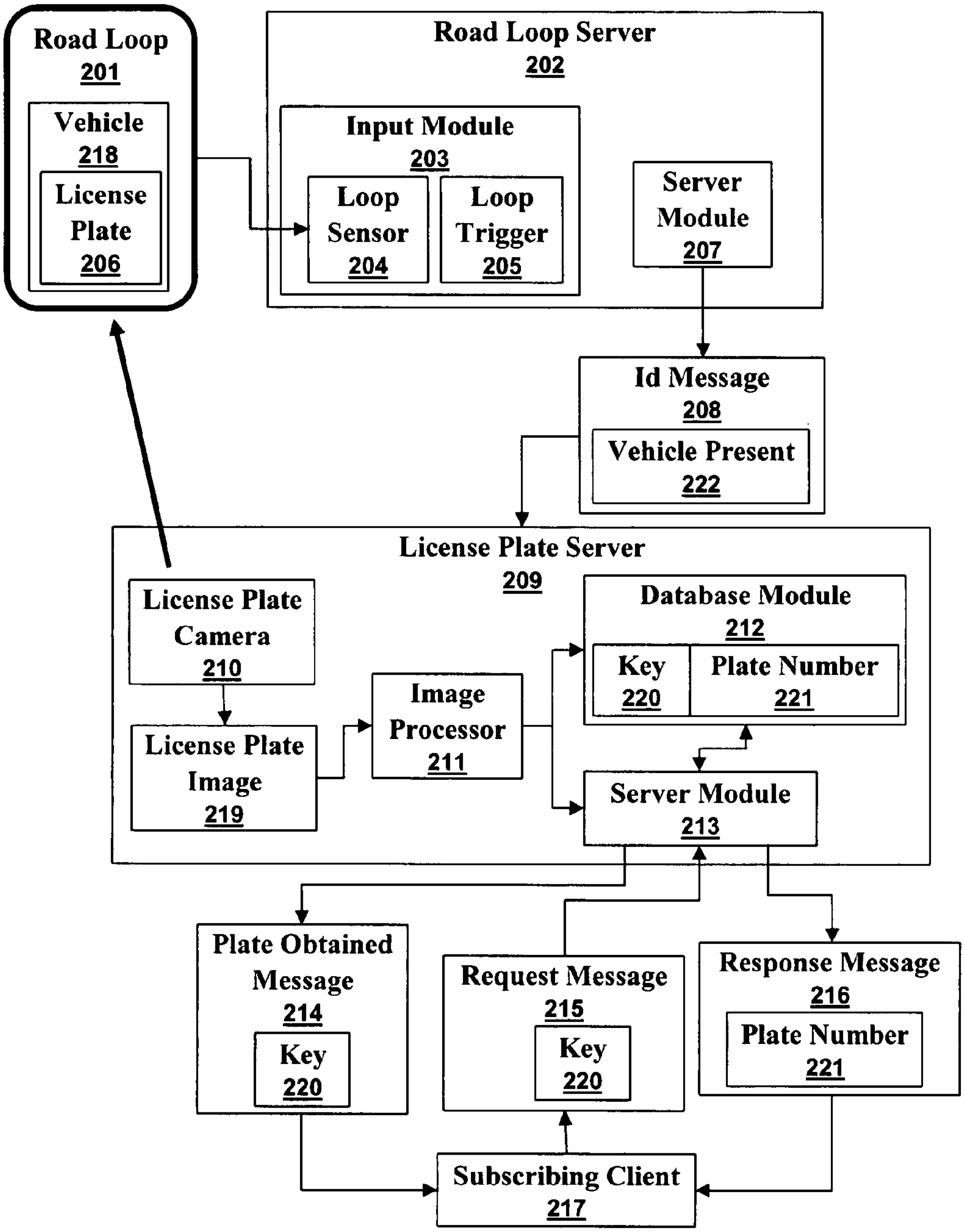
FIG. 2 illustrates a high level block diagram of a road loop server and a license plate server in accordance with aspects of the embodiments.

FIG. 2 illustrates a high level block diagram of a road loop server 201 and a license plate server 209 in accordance with aspects of the embodiments. A loop sensor 204 monitors a road loop 201 so that a loop trigger 205 is activated when vehicle 218 enters the road loop 201. In FIG. 2, the loop sensor 204 is part of the input module 203. The identification event that triggers obtaining identification data can be the vehicle 218 entering the road loop 201 or, equivalently, the loop trigger 205 activation that occurs when the vehicle 218 is sensed. The identification data is the "vehicle present" state of the loop trigger 205. The server module 207 sends Id message 208 containing "Vehicle Present" 222 to a license plate server 209. "Vehicle Present" 222 can be a text string, an event flag, or a Boolean value.

The license plate camera 210 obtains a license plate image 219 of the vehicle's 218 license plate 206 when the license plate server 209 receives id message 208. The license plate image 219 is passed to an image processor 211 that reads a plate number 221. The plate number 221 is stored in a database module 212 with a key 220. The Id message then sent by the server module 213 is a plate obtained message 214 containing the key 220. A subscribing client 217 receives the plate obtained message 214. After determining that it needs the plate number 221, the subscribing client 217 send a request message 215 containing the key 220 to the license plate server 209. The key 220 is used to retrieve the plate number 221 from the database module 212. The plate number 221 is then sent in a response message 216 to the subscribing client 217.

Figure 3:
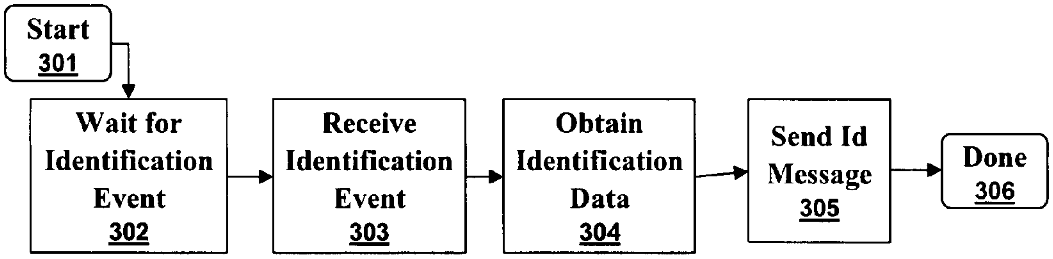
FIG. 3 illustrates a high level flow diagram of obtaining and sending identification data in accordance with aspects of the embodiments.

FIG. 3 illustrates a high level flow diagram of obtaining and sending identification data in accordance with aspects of the embodiments. After the start 301, an identification server waits for an identification event 302. After receiving the identification event 303, the identification server obtains identification data 304 and then sends an Id message 305 to the subscribing clients before done 306.

Figure 4:
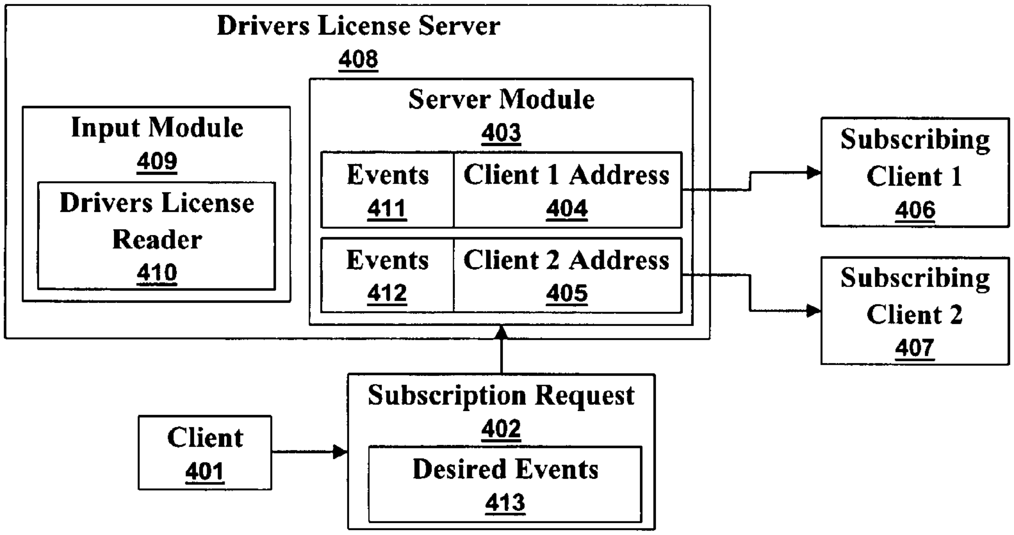
FIG. 4 illustrates a high level block diagram of a driver's license server in accordance with aspects of the embodiments.

FIG. 4 illustrates a high level block diagram of a driver's license server 408 in accordance with aspects of the embodiments. A client 401 can send a subscription request 402 to an identification server, such as the driver's license server 408. The subscription request 402 can contain desired events 413. Most identification servers can be triggered by many different identification events. Some identification servers are triggered by an identification event that is then classified as a specific type of event. For example, the driver's license server's 408 identification event occurs whenever a driver's license is passed through the input module's 409 driver's license reader 410. After reading the driver's license, the driver's license server can classify the identification information as "over 21", "under 21", and "21st birthday" and can produce one of the events every time a driver's license is read. The client 401 can be a device that prints out a drink coupon with the desired event of "21st birthday". Meanwhile, events 411 can be "under 21" so that subscribing client 1 406 can alert a door man. Event 412 can be "over 21" such that subscribing client 2 407 requests additional data from the driver's license module such as gender, name, or driver's license number. The additional data can be used to vary a cover charge, to flag favored patrons, or help exclude disfavored ex-patrons.

Some events can be programmed events. For example, a GUI can send a subscription request to a driver's license reader with the desired event being "FirstName=Tyler, LastName=Durden". Similarly, it subscribes to a license plate server with a programmed event looking for Tyler Durden's license plate number. The person watching the GUI in this case is quite obviously tracking Tyler Durden. The central database server of FIG. 1 can also be interrogated to investigate Tyler Durden's movements before he became a person of interest.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system comprising:

a plurality of identification servers connected to a communications network wherein every identification server is configured to receive at least one of a plurality of identification events wherein one of the identification servers is a license plate server comprising a license plate camera and wherein another one of the identification servers is a road loop server comprising a road loop sensor;

a plurality of subscribing clients;

a central database server that is one of the subscribing clients, wherein said the central database server is configured to store said the identification events for future retrieval and use;

a processing server that is one of the subscribing clients;

a graphical user interface that is one of the subscribing clients;

a plurality of messages transmitted over the communications network wherein the messages comprise a plurality of id messages and a plurality of subscription requests wherein each of the subscribing clients sends at least one of the subscription requests to at least one of the identification servers to thereby subscribe to the at least one of the identification servers, wherein the identification events trigger the identification servers to obtain identification data and to send the identification data to the subscribing clients based on which of the subscribing clients is subscribed to which of the identification servers, wherein sensing a vehicle in the road loop triggers the road loop server to obtain identification data indicating that a vehicle is present in the road loop, and wherein the license plate server subscribes to the road loop server by sending one of the plurality of subscription requests; and wherein receiving a message from the road loop server is the license plate server's identification event.

2. The system of claim 1 wherein the id messages comprise the identification data.

3. The system of claim 1:

wherein one of the identification servers is a database server that comprises a database module;

wherein the database module stores the identification data in association with a plurality of identifiers;

wherein the database server receives an identification event comprising one of the identifiers; and wherein the database server sends the identification data associated with the one of the identifiers to the subscribing clients.

4. The system of claim 1 wherein one of the identification servers is a driver's license server comprising a driver's license reader that is triggered to read the identification data from a drivers license when the driver's license is scanned by the driver's license reader.

5. The system of claim 1:

wherein sensing a vehicle in the road loop is one of the identification events.

6. A system comprising:

a plurality of subscribing clients connected to a communications network;

a central database server that is one of the subscribing clients;

a graphical user interface that is one of the subscribing clients;

a plurality of messages transmitted over the communications network wherein the messages comprise a plurality of id messages;

a plurality of identification servers comprising an input module and a server module wherein one or more of the subscribing clients subscribes to each of the identification servers wherein the identification servers receive identification events;

a simple server that is one of the identification servers wherein the simple server comprises a second input module and a second server module and wherein the simple server is a road loop server that comprises a road loop sensor;

a processing server that is another one of the identification servers wherein the processing server is a license plate server comprising a license plate camera;

a plurality of subscription requests that are messages sent from the subscribing clients to the identification servers to thereby subscribe various of the subscribing clients to various of the identifications servers wherein the processing server subscribes to the simple server and wherein the license plate server subscribes to the road loop sensor by sending one of the plurality of subscription requests;

wherein at least one of the identification events triggers the simple server to obtain identification data and to send one of the id messages to the simple server's subscribing clients, wherein the id messages comprise the obtained identification data and wherein the license plate server's identification event is the identification message sent by the road loop server; and wherein the processing server further comprises a processing module wherein at least one of the identification events triggers the processing server to obtain raw data, processes the raw data to produce identification data, and to send one of the id messages to the processing server's subscribing clients.

7. The system of claim 6:

wherein one of the identification servers comprises a database module and is configured to receive an identification event comprising one of the id messages that comprises one of a plurality of identifiers;

wherein the database module stores the identification data in association with the plurality of identifiers; and wherein the one of the identification servers sends a response message comprising the identification data associated with the one of the identifiers to every subscribing client that subscribes to the one of the identification servers.

8. The system of claim 6 wherein one of the identification servers is a driver's license server comprising a driver's license reader that is triggered to read the identification data from a drivers license when the driver's license is scanned by the driver's license reader.

9. The system of claim 6:

wherein sensing a vehicle in the road loop is the identification event for the road loop server.

10. The system of claim 6 wherein the license plate camera takes a license plate image, wherein the processing module comprises an image processing module that processes the license plate image to obtain a plate number, and wherein the identification data comprises the plate number.

11. A method comprising:

providing a plurality of identification servers wherein one of the identification servers is a license plate server comprising a license plate camera and another one of the identification servers is a road loop server comprising a road loop sensor;

receiving a subscription request from at least one of a plurality of subscribing clients wherein the license plate server subscribes to the road loop server by sending a subscription request;

waiting for an identification event wherein receiving a message from the road loop server is the license plate server's identification event;

receiving the identification event;

obtaining identification data wherein sensing a vehicle in the road loop triggers the road loop server to obtain identification data indicating that a vehicle is present in the road loop; and sending an id message to the at least one of the subscribing clients, wherein the id message comprises the obtained identification data and wherein one of the subscribing clients is a central database server and another of the subscribing clients is a graphical user interface.

12. The method of claim 11 further comprising:

storing the identification data in a database module in association with a key wherein the id message comprises the key;

receiving a request message comprising the key; and sending a response message comprising the identification data.

13. The method of claim 11 wherein the identification data is obtained from a driver's license by a driver's license reader and wherein the identification event occurs when the driver's license is read by the driver's license reader.

14. The method of claim 11 wherein the identification event triggers a license plate camera to take a picture of a license plate.

* * * * *